Feb. 19, 1924. 1,484,543
B. WOLHAUPTER ET AL
INSULATED RAIL JOINT
Filed July 9, 1923 3 Sheets-Sheet 1
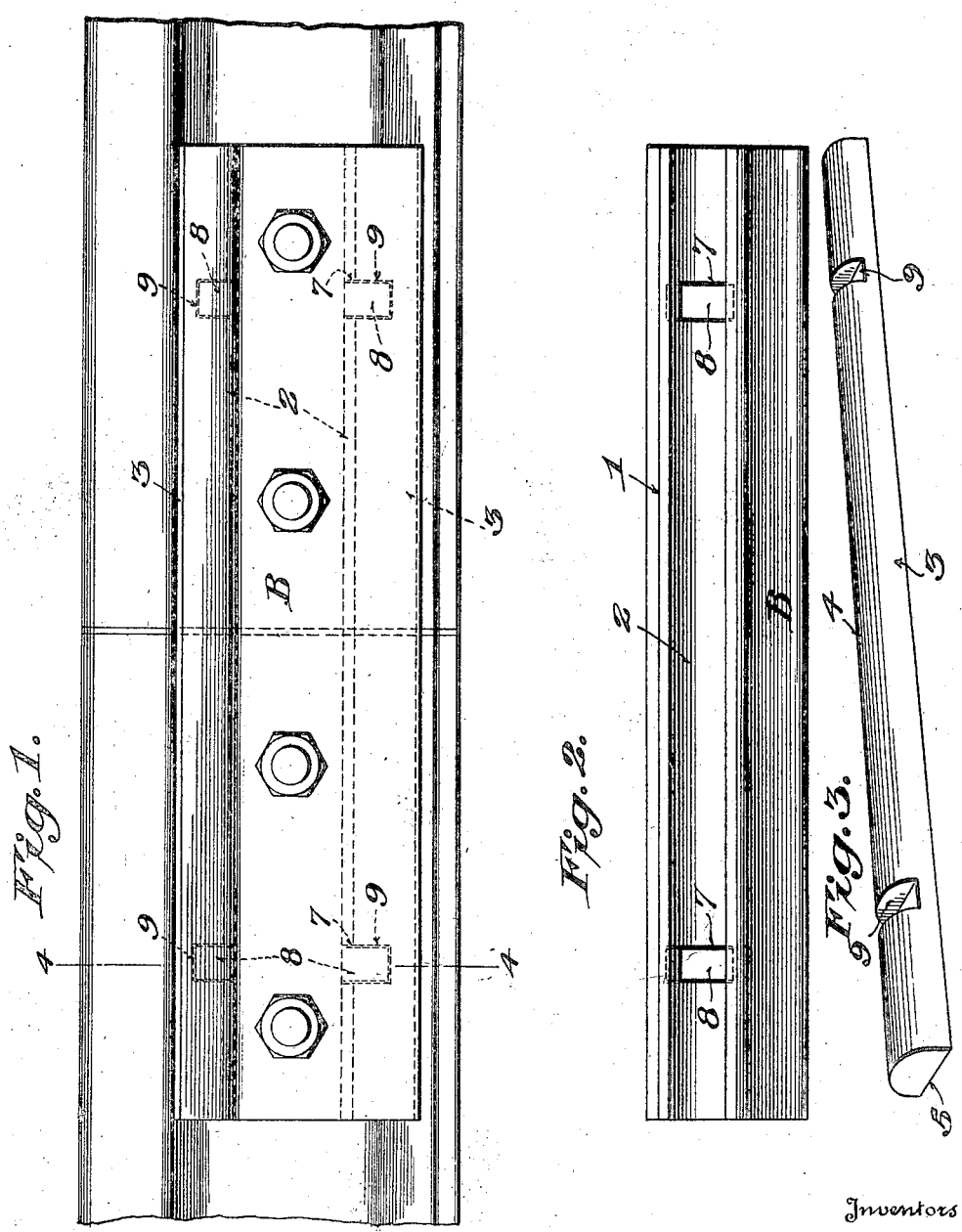
Inventors
B. Wolhaupter,
C. A Disbrow,

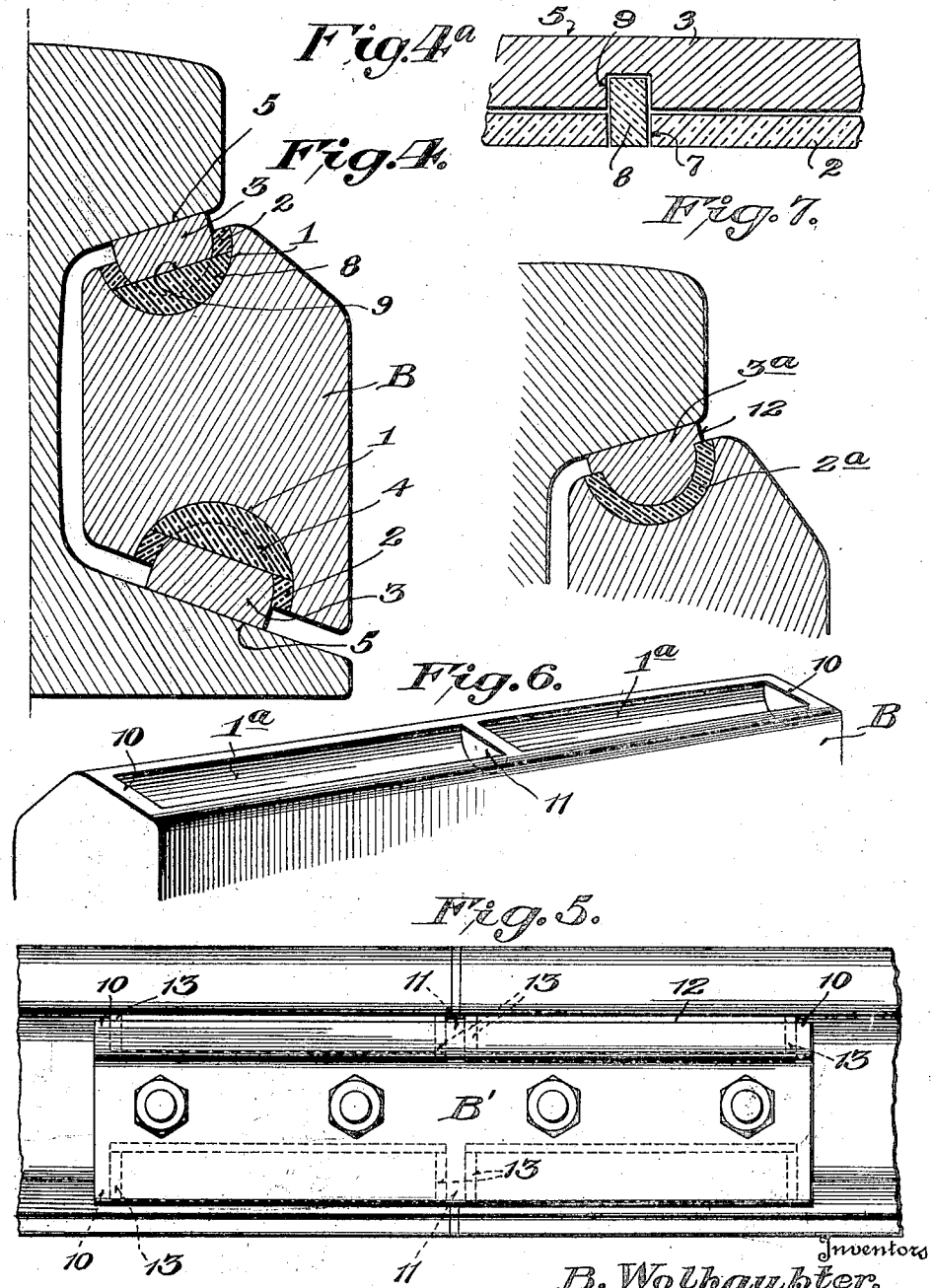

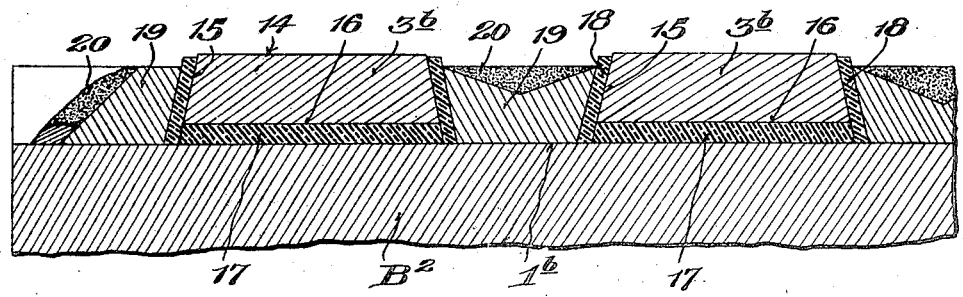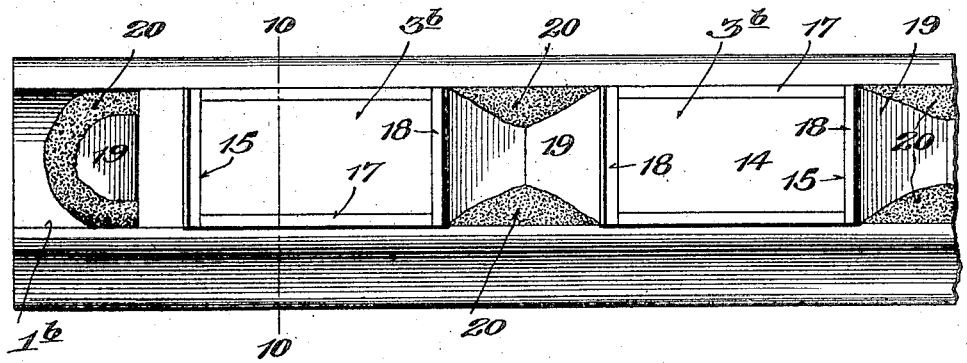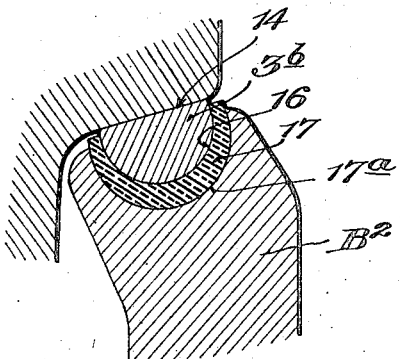

Patented Feb. 19, 1924.

1,484,543

UNITED STATES PATENT OFFICE.

BENJAMIN WOLHAUPTER AND CLARKSON A. DISBROW, OF NEW ROCHELLE, NEW YORK, ASSIGNORS TO THE RAIL JOINT COMPANY, OF NEW YORK, N. Y., A CORPORATION OF NEW YORK.

INSULATED RAIL JOINT.

Application filed July 9, 1923. Serial No. 650,451.

*To all whom it may concern:*

Be it known that we, BENJAMIN WOLHAUPTER and CLARKSON A. DISBROW, citizens of the United States, both residing at New Rochelle, county of Westchester, and State of New York, have invented certain new and useful Improvements in Insulated Rail Joints, of which the following is a specification.

This invention relates to insulated rail joints, and more particularly to joints of the type shown in the patent to McCauley No. 1,205,647, dated Nov. 21, 1916, and in which the insulation is confined or housed by metallic parts in such a way as to protect the insulation against excessive wear and abrasion and thereby lengthen its life.

To that end the invention has primarily in view the provision of a simple and practical construction which affords an inexpensive way of making an insulated joint of the type referred to by eliminating much of the accurate mill work required to produce such a rail joint. That is to say, the invention contemplates a construction which can be made by rolling or othewise fabricating the bar in such a way as to avoid the use of drills, milling cutters or other special mill operations thereby providing a more economical bar of the McCauley type.

Another object of the invention is to provide a construction which allows of slight variations in the length of the rail bearing parts of the joint bar and yet permits of completely and satisfactorily confining the insulation in the bar.

A further object of the invention is to provide a construction of the character set forth which provides for an adjustment between the bearing members of the joint bar and the rails so that pressure will be evenly and uniformly distributed on the insulation even though the joint bars should be applied in a canted or cocked position.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:

Figure 1 is a side elevation of a joint bar embodying the present improvements.

Figure 2 is a top plan view of a rolled joint bar made in accordance with the present invention.

Figure 3 is a perspective view of a rail bearing member adapted to fit in the groove rolled in the head or foot of the joint bar.

Figure 4 is a detail sectional view taken on the line 4—4 of Fig. 1.

Figure 4ª is a detail view illustrating the manner in which the main insulation interlocks with the insulating keys.

Figure 5 is a side elevation of a joint illustrating a modified form of the invention.

Figure 6 is a detail perspective view of the top of the bar shown in Fig. 5.

Figure 7 is a detail sectional view of the construction shown in Fig. 5.

Figure 8 is a detail longitudinal sectional view of a portion of the head of a joint bar showing a modified form of the invention wherein the insulation is held against longitudinal shifting by welded parts.

Figure 9 is a top plan view of the construction shown in Fig. 8.

Figure 10 is a detail cross-sectional view taken on the line 10—10 of Fig. 9.

In carrying out the objects of the present invention it is proposed to provide a joint bar which may be readily and economically made either by rolling mill or other methods which will dispense with machining or other costly operations, thereby economically producing a joint construction having broadly the principle of the McCauley patent but particularly having an important improvement in the manner of mounting and assembling the metal bearing blocks and insulation whereby the insulation is housed and shielded from direct contact with the rail and prevented from mashing out or shredding as usually happens under the abrasive effect due to the relative movement between the rail head and the joint bar.

According to the embodiment of the invention shown in Fig. 1 of the drawings, the bar B may be formed at the time of rolling with longitudinal channels or grooves 1 at the top and bottom edges of the bar. These grooves extend the full length of the bar and are adapted to receive a strip of insulation 2 which provides a seat for a continuous self adjusting metal rail bearing bar or strip 3. This bar is preferably rounded or curved as indicated at 4 to uniformly bear on the insulation 2 which is fitted in the half round groove 1 and has a flat rail engaging face 5 which bears against the underside of the rail head or upper side of the foot flange thereof according to whether it is placed at the top or bottom edge of the bar as clearly shown in Fig. 4 of the drawings.

The distinctive feature of this form of the invention is the provision of a groove and a continuous rail bearing bar for confining the insulation 1 in the groove and assuming the abrasive action between the rail and the joint bar. In order to prevent the longitudinal shifting or creeping of the rail bearing member 3 any suitable and convenient means may be provided for interlocking the bar with the insulation, as for example shown in Figs. 2 and 3 of the drawings wherein it will be observed the insulation strip 1 is provided at suitable intervals with the slots 7 for receiving insulation keys 8 which lie transversely of the insulation strip 1 and are adapted to interlock with the key slots 9 formed in the curved face 4 of the bearing member.

Obviously, with this form of construction the insulation is effectually confined while at the same time the rail bearing member is held against endwise movement. Also, due to the fact that the rail bearing member 3 has a relatively rockable or circumferentially shiftable engagement with the insulation 1 it is always possible to maintain a proper bearing contact between the face 5 of the rail bearing member and the fishing surfaces of the rail head and rail base even though the bar B should be applied in a canted or cocked position. Furthermore, by reason of the way in which the grooves and complemental rail bearing members are designed a slight variation in the length of either the splice bar B or the member 9 is allowable and yet the insulation may be completely confined.

A modification of the invention is shown in Figures 5, 6 and 7 of the drawings wherein the grooves $1^a$ do not extend continuously throughout the length of the bar $B'$ but are made in the form of two enclosed grooves having the walls 10 at the ends of the bar and the intermediate partition wall 11. In this form, the insulating strip or shoe $2^a$ is fitted in the bottom of the half round grooves $1^a$, and separate rail bearing members $3^a$ are provided for each groove. These rail bearing members may be provided with the side flanges 12 which overlie a portion of the upper edge of the insulation $2^a$ and afford further protection therefor. Also, in this form of the invention it is necessary to use the insulation pieces 13 at the ends of the grooves $1^a$ so as to properly insulate the steel or other metal rail bearing members $3^a$ from the joint bar $B'$.

A novel built-up or fabricated construction is shown in Figures 8 and 9 of the drawings wherein it is proposed to form the joint bar $B^2$ with grooves $1^b$, the same being formed when the bar is rolled and extending throughout the length of the bar. At any selected intervals within the groove insulated rail bearing members $3^b$ are located. These members preferably have a flat rail engaging face 14 and the inclined end walls 15 while the rounded bottom sides 16 thereof rest upon insulating strips 17. In connection with the insulating strips 17 it is pointed out that the top and bottom surfaces thereof are struck on arcs of different radii which produces the effect of a relatively thick medial portion and relatively thin edges for the strip. This arrangement provides increased bearing efficiency for the strip and also provides a greater quantity of insulation where most of the bearing pressure is focused. The inclined ends 15 of the rail bearing members $3^b$ are covered with insulating pieces 18 and then the rail bearing members are locked in position by suitable key blocks 19 which in turn are welded as at 20 to the adjacent faces of the joint bar. Thus, the metal rail bearing members or blocks $3^b$ are not only locked against longitudinal movement in the groove $1^b$, but are also locked to the bar. This construction affords opportunity to seat the rail bearing blocks or strips at any desired spacing, and in any preferred rail bearing location.

From the foregoing it will be apparent that the distinctive feature of all the forms of the invention shown herein is the provision of relatively capacious grooves in the top and bottom sides of the bar which are of sufficient size to permit of insulation strips of adequate area being used, and which also greatly facilitate the manufacture of the joint and the assembly of the parts in installing the same.

Without further description it is thought that the features and advantages of the present invention will be readily apparent and it will of course be understood that changes in the form, proportion and minor details of construction may be resorted to without departing from the scope of the invention or spirit of the appended claims.

We claim:

1. An insulated rail joint including a joint bar having a longitudinally disposed groove therein, a metal rail bearing block arranged in said groove and insulation seated in said groove and embracing the metal bearing block.

2. An insulated rail joint including a joint bar having a groove, insulation in said groove, and a self-adjusting rail bearing member engaging and holding said insulation.

3. An insulated rail joint including a joint bar having therein a rounded groove, insulation fitting and conforming to the groove and a metal bearing block engaging and conforming to the insulation.

4. An insulated rail joint including a joint bar having therein a rounded groove, insulation fitting and conforming to said groove and a metal rail bearing block having a flat rail engaging surface and a rounded insulation engaging surface.

5. An insulated rail joint including a joint bar having a groove in the head thereof, a self-adjusting rail bearing member, insulation confined in the groove and engaging said rail bearing member, and means for interlocking the rail bearing member with the insulation.

6. An insulated rail joint including a joint bar having therein a groove, insulated metal rail bearing blocks seated in the groove at predetermined locations, and fastening means for locking the metal bearing blocks in place.

7. An insulated rail joint including a joint bar having therein a groove, insulated metal rail bearing blocks seated in the groove at predetermined locations and welded fastening means for locking the metal bearing blocks in place.

In testimony whereof we hereunto affix our signatures in the presence of two witnesses.

BENJAMIN WOLHAUPTER.
CLARKSON A. DISBROW.

Witnesses:
E. K. KERSHNER,
KATHERINE McNALLY.